United States Patent
Starek

(10) Patent No.: US 10,556,310 B2
(45) Date of Patent: Feb. 11, 2020

(54) METHOD FOR CUTTING MACHINING OF TURBINE BLADES

(71) Applicant: Liechti Engineering AG, Langnau Im Emmental (CH)

(72) Inventor: Martin Starek, Rüfenacht (CH)

(73) Assignee: GF Machining Solutions AG (CH)

(*) Notice: Subject to any disclaimer, the term of this patent is extended or adjusted under 35 U.S.C. 154(b) by 138 days.

(21) Appl. No.: 15/803,952

(22) Filed: Nov. 6, 2017

(65) Prior Publication Data
US 2018/0147678 A1    May 31, 2018

(30) Foreign Application Priority Data

Nov. 29, 2016 (EP) ..................................... 16201260

(51) Int. Cl.
*B23Q 3/06*        (2006.01)
*B23P 15/02*       (2006.01)

(52) U.S. Cl.
CPC ............. *B23Q 3/063* (2013.01); *B23P 15/02* (2013.01); *B23Q 2240/007* (2013.01); *B23Q 2703/10* (2013.01)

(58) Field of Classification Search
CPC ............. B23Q 3/063; B23Q 2230/006; B23Q 2703/10; B23Q 2240/007; B23Q 2230/002; B23P 15/02; B23C 3/18
See application file for complete search history.

(56) References Cited

U.S. PATENT DOCUMENTS

| | | | | |
|---|---|---|---|---|
| 3,501,999 A | * | 3/1970 | Parks | B23Q 1/0009 |
| | | | | 409/178 |
| 7,261,500 B2 | * | 8/2007 | Killer | B23C 3/18 |
| | | | | 29/889.7 |
| 9,498,861 B2 | * | 11/2016 | Keller | B23C 3/18 |
| 2013/0269189 A1 | * | 10/2013 | Keller | B23C 3/18 |
| | | | | 29/889.7 |
| 2017/0223439 A1 | * | 8/2017 | Cross | H04R 1/026 |

FOREIGN PATENT DOCUMENTS

| | | |
|---|---|---|
| CH | 693610 A5 | 11/2003 |
| EP | 2618961 B1 | 11/2014 |
| WO | WO-2015-157166 A1 | 10/2015 |

* cited by examiner

*Primary Examiner* — David P Bryant
*Assistant Examiner* — Lawrence Averick
(74) *Attorney, Agent, or Firm* — Harness, Dickey & Pierce, P.L.C.

(57) ABSTRACT

A method for cutting machining of turbine blades (1) on a multi-axis machine tool, the turbine blade (1) is held by a rotatable blade-root clamping device and a rotatable blade-tip clamping device (2) and is machined by means of a tool which is chucked in a tool spindle. A first profile section (4) which is adjacent to the blade tip is first of all machined by the tool and the tool is then removed. The tool spindle then grabs an already horizontal additional clamping device (5) which has clamping jaws (6.1, 6.2) adapted to the first profile section (4). The additional clamping device (5) is positioned on the blade-tip clamping device (2) in such a way that the clamping jaws (6.1, 6.2) rest in the first profile section (4). The tool spindle then grabs a tool and machines the remaining profile section with it.

9 Claims, 1 Drawing Sheet

METHOD FOR CUTTING MACHINING OF TURBINE BLADES

CROSS-REFERENCE TO RELATED APPLICATION

Figure 1:
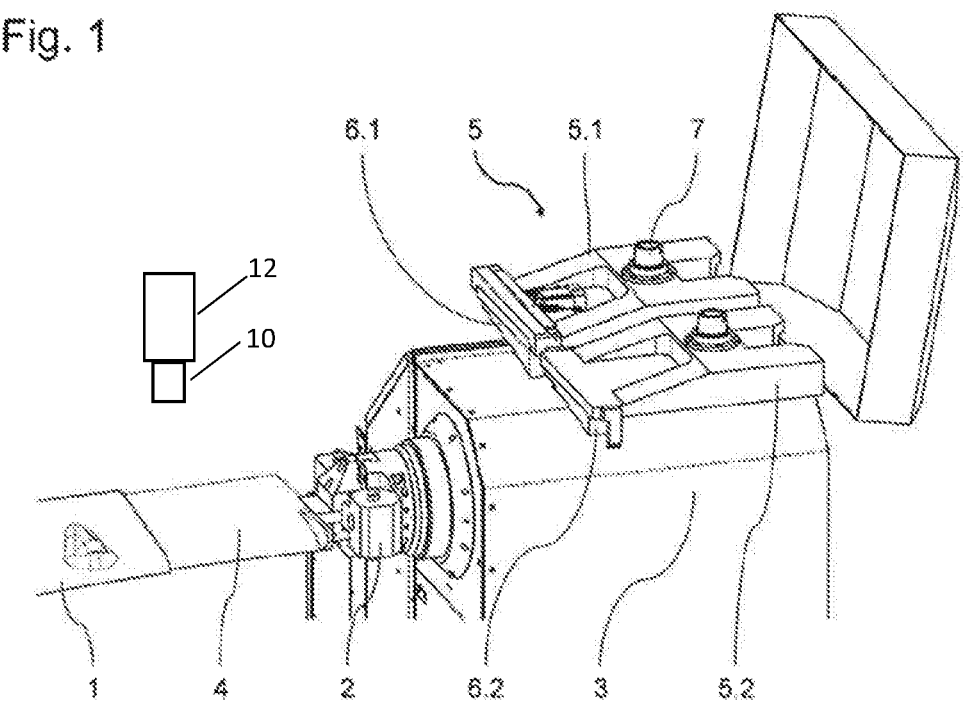

This application claims the benefit and priority of EP 16 201 260.3, filed Nov. 29, 2016. The entire disclosure of the above application is incorporated herein by reference.

TECHNICAL FIELD

The invention relates to a method for cutting machining of turbine blades on a multi-axis machine tool, wherein the turbine blade is held by a rotatable blade-root clamping device a rotatable blade-tip clamping device and is machined by means of a tool which is chucked in a tool spindle.

BACKGROUND

In such methods, the elastic bending of the turbine blade which is caused by cutting forces is a known problem. This bending detrimentally affects the accuracy of the machining and can lead to vibrations in the turbine blade, as a result of which the surface quality in the machined profile sections is impaired.

A solution of the above-mentioned problem is known from document EP-2618961-B1, in which the turbine blade during the machining is supported in certain sections by means of a back stay which can travel along the blade axis. This back stay has a number of plungers which can move along their axis and are pressed against the turbine blade in order to support this. This back stay requires a relatively large amount of space all around the turbine blade, requires additional drives, detrimentally affects the accessibility to the turbine blade and can obstruct the falling of chips. Moreover, during a change of the profile section which is to be machined the back stay has to be circumvented by the tool, which necessitates a considerable programming cost and involves a certain risk of collision anyway. Moreover, the finish-machined blade surface can be damaged by the plungers, for example by these leaving behind impressions.

Documents CH-693610-A5 and WO-2015/157166-A1 show devices with clamping jaws which are adapted to the blade profile, but the workpiece has to be reclamped there in order to be able to machine all the profile sections.

Starting from this prior art, an aspect of the invention is based on the object of proposing a method for cutting machining of turbine blades, in which the turbine blade is machined in a single chucking, wherein in the region of the blade tip the chucking is such that a bending of the turbine blade as a consequence of cutting forces is reduced and vibrations are damped.

This aspect is achieved by a first profile section which is adjacent to the blade tip being machined first of all by the tool, by the tool then being removed and the tool spindle grabbing an additional clamping device which has clamping jaws adapted to the first profile section, by the additional clamping device being positioned on the blade-tip clamping device in such a way that the clamping jaws rest in the first profile section, and by the tool spindle grabbing a tool and machining the remaining profile section with it.

DRAWINGS

This embodiment according to the invention of the method has the following advantages. The space between the blade-root clamping device and the additional clamping device remains free during the machining of the remaining profile section so that the turbine blade remains accessible for the tool and the chips can fall down freely. As a result of this accessibility, there is no risk of collision for the tool and the programming of the machining is simpler compared with the known prior art. Furthermore, the machine tool does not need an additional axis for handling the additional clamping device and finally care is taken of the surface of the blade profile as a result of the adapted clamping jaws.

Particular types of embodiment of the invention are described in the dependent claims.

Figure 2:
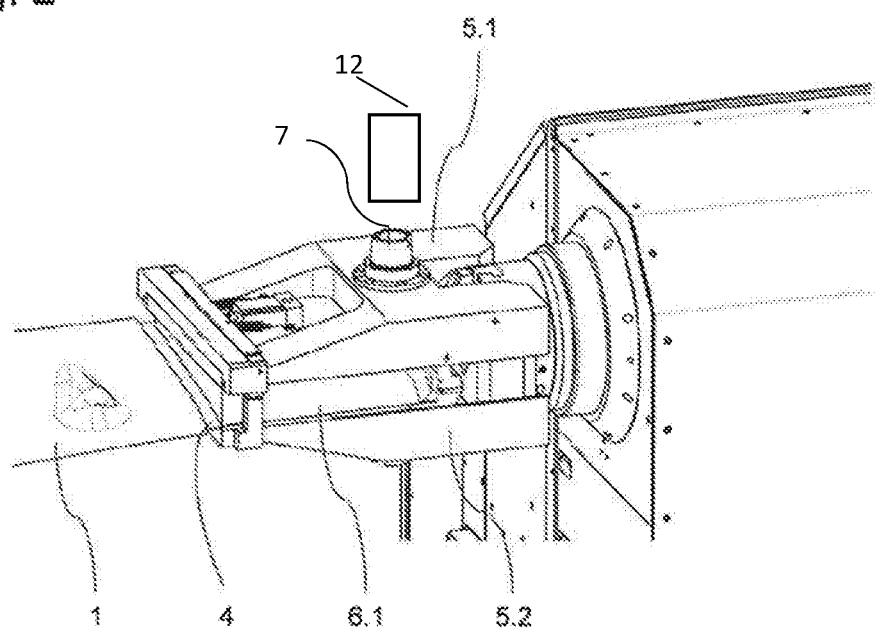

Exemplary embodiments of the invention are explained below with reference to the attached drawings. In the drawings:

FIG. 1 shows a perspective view of the region of the blade-tip clamping device of a machine tool after the machining of a first profile section and FIG. 2 shows a view corresponding to FIG. 1 after attaching the additional clamping device.

DETAILED DESCRIPTION

The two drawing figures show in perspective views a region of a machine tool during the machining of the turbine blade 1, with a rotatably drivable blade-tip clamping device 2. The axis and the drive of this blade-tip clamping device 2 are accommodated in a housing 3. Provision is made for a blade-root clamping device which is disposed opposite the blade-tip clamping device 2 and for a tool axis which is oriented at an angle to the longitudinal axis of the turbine blade 1. It is shown in FIG. 1 that a first profile section 4 which is adjacent to the blade tip has already been machined by the tool 10. This machining does not necessarily have to be finish-machining. It is only important that the profile section provides a defined, stable contact surface for the clamping jaws mentioned below.

An additional clamping device 5, consisting of two parts 5.1 and 5.2, for stabilising said first profile section 4 is mounted on the housing 3 later application in the view according to FIG. 1. Each part 5.1, 5.2 of the additional clamping device 5 is equipped with a clamping jaw 6.1, 6.2, the clamping face of which is adapted to the already machined first profile section 4. The clamping jaws 6.1 and 6.2 do not have to butt against the section 4 in a full-faced manner but can have interrupted contact sections. Each part 5.1, 5.2 of the additional clamping device 5 also has an upwardly projecting manipulating pin 7 which can be grabbed by the tool spindle 12 after the tool 10, for example a miller, which was previously chucked in this has been deposited in a tool magazine.

In the view according to FIG. 2, the two parts 5.1 and 5.2 of the additional clamping device 5 have been brought into their position on the blade tip by the tool spindle 12 and clamped tight. In the process, the first part 5.1 was first of all grabbed by its manipulating pin 7 by the tool spindle 12 and by means of a zero-point clamping device fixed on the blade-tip clamping device 2 for example on the suction side of the turbine blade 1 and the turbine blade was then rotated by 180 degrees. After that, the second part 5.2 was fixed by means of the tool spindle 12 in a similar manner on the pressure side of the turbine blade. The manipulating pins 7 are hollow and enable the operation of the additional clamping device 5 for example by means of a pressurised fluid, for example compressed air, which is fed through the tool spindle 12. In this case, the additional clamping device 5 is released under pressure and clamped if it is unpressurised.

Compared with the prior art which is known from document EP-2618961-B1 mentioned in the introduction, the previously described method is managed with significantly lower costs and practically without maintenance. Also, the programming is less complex and allows a fixed, fully automatic positioning of the tool without risk of collision, even in the event of variable blank sizes.

LIST OF DESIGNATIONS

1 Turbine blade
2 Blade-tip clamping device
3 Housing
4 First profile section
5 Additional clamping device
5.1 Part of the additional clamping device 5
5.2 Part of the additional clamping device 5
6.1 Clamping jaw
6.2 Clamping jaw
7 Manipulating pin

What is claimed is:

1. A method for cutting machining of turbine blades on a multi-axis machine tool, comprising wherein the turbine blade is held by a rotatable blade-root clamping device and a rotatable blade-tip clamping device and is machined by means of a tool which is chucked in a tool spindle, wherein a first profile section which is adjacent to the blade tip first machined by the tool, in that the tool is then removed and the tool spindle grabs an additional clamping device which has clamping jaws adapted to the first profile section, in that the additional clamping device is positioned on the blade-tip clamping device in such a way that the clamping jaws rest in the first profile section, in that the tool spindle grabs a tool and machines the remaining profile section with the tool.

2. The method according to claim 1, wherein the additional clamping device is fastened on the blade-tip clamping device by means of a zero-point clamping system.

3. The method according to claim 1, wherein the clamping jaws are arranged in the additional clamping device in an exchangeable manner.

4. The method according to claim 1, wherein the additional clamping device consists of two parts, of which each has a clamping jaw.

5. The method according to claim 4, wherein a first part of the additional clamping device is first attached on the suction side or the pressure side of the machined profile section, secondly, wherein the turbine blade is rotated by 180 degrees and then a second part of the additional clamping device is attached on the pressure side or the suction side of the machined profile section.

6. The method according to claim 5, wherein a manipulating pin is arranged on each part of the additional clamping device for grabbing the part by the tool spindle.

7. The method according to claim 6, wherein the manipulating pin is hollow.

8. The method according to claim 7, wherein the additional clamping device is clamped or released by a pressurised fluid which is fed through the tool spindle.

9. A method for machining a turbine blade with a machine having a spindle into which a cutting tool is chucked, the turbine blade having a tip and a root, said method comprising:

clamping the tip of the blade and a using the tool to machine a first profile section adjacent the tip;
providing first and second additional clamping devices;
grasping the first additional clamping device with the spindle and a moving the first additional clamping device so that a jaw thereon rests on a surface of the first profile section;
rotating the blade;
grasping the second additional clamping device with the spindle and moving the second additional clamping device so that a jaw thereon rests on an opposite surface of the first profile section; and
thereafter, using a tool to machine a second profile section of the blade adjacent the first profile section towards the root.

* * * * *